United States Patent
Corazza et al.

(10) Patent No.: US 10,403,045 B2
(45) Date of Patent: Sep. 3, 2019

(54) PHOTOREALISTIC AUGMENTED REALITY SYSTEM

(71) Applicant: Adobe Inc., San Jose, CA (US)

(72) Inventors: Stefano Koenig Corazza, Richmond, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/675,045

(22) Filed: Aug. 11, 2017

(65) Prior Publication Data

US 2019/0051052 A1 Feb. 14, 2019

(51) Int. Cl.
    *G06T 15/50* (2011.01)
    *G06T 15/60* (2006.01)
    *G06T 19/00* (2011.01)

(52) U.S. Cl.
    CPC .......... *G06T 19/006* (2013.01); *G06T 15/503* (2013.01); *G06T 15/506* (2013.01); *G06T 15/60* (2013.01); *G06T 2215/16* (2013.01)

(58) Field of Classification Search
    CPC .................................................. G06T 19/006
    USPC ......................................................... 345/426
    See application file for complete search history.

(56) References Cited

U.S. PATENT DOCUMENTS

| | | | |
|---|---|---|---|
| 5,517,580 A | 5/1996 | Markandey | |
| 6,636,627 B1 | 10/2003 | Oosawa | |
| 8,036,451 B2 | 10/2011 | Redert | |
| 8,289,318 B1 | 10/2012 | Hadap et al. | |
| 8,687,001 B2 | 4/2014 | Shim | |
| 9,285,872 B1 | 3/2016 | Raffle et al. | |
| 9,299,188 B2 | 3/2016 | Karsch et al. | |
| 9,613,454 B2 | 4/2017 | Karsch et al. | |
| 10,134,198 B2 | 11/2018 | Miller et al. | |
| 2002/0128060 A1 | 9/2002 | Belhumeur | |
| 2006/0103728 A1 | 5/2006 | Ishigami et al. | |
| 2010/0046802 A1 | 2/2010 | Watanabe | |

(Continued)

FOREIGN PATENT DOCUMENTS

WO  WO-2013155217  10/2013

OTHER PUBLICATIONS

"Restriction Requirement", U.S. Appl. No. 15/133,025, dated Jun. 22, 2017, 6 pages.

(Continued)

*Primary Examiner* — Shivang I Patel
(74) *Attorney, Agent, or Firm* — SBMC

(57) ABSTRACT

A digital medium environment includes at least one computing device (e.g., a user's mobile device) in an environment. Systems and techniques are described for presenting a photorealistic augmented reality experience in real time on the computing device. A lighting representation of the environment is obtained from a partial view of the environment, such as from an image of the environment, and used to render a 3D asset (e.g., graphics of a synthetic object). The 3D asset is inserted into the environment by compositing the rendered 3D asset with the image of the environment accounting for occlusion and based on the lighting representation to form a composite image. Photorealistic processing is applied to the composite image by adding lighting for the rendered 3D asset to a portion of the background of the composite image. Consequently, the inserted graphic is indistinguishable from the real-world scene.

20 Claims, 6 Drawing Sheets

(56) References Cited

U.S. PATENT DOCUMENTS

| | | | |
|---|---|---|---|
| 2012/0068913 A1 | 3/2012 | Bar-Zeev et al. | |
| 2013/0121567 A1 | 5/2013 | Hadap | |
| 2013/0147798 A1* | 6/2013 | Karsch | G06T 19/006 345/420 |
| 2013/0271489 A1* | 10/2013 | Levesque | G06T 11/00 345/619 |
| 2015/0363978 A1* | 12/2015 | Maimone | G02B 27/0172 345/633 |
| 2016/0328884 A1 | 11/2016 | Schowengerdt et al. | |
| 2017/0176818 A1 | 6/2017 | Shi et al. | |
| 2017/0255814 A1 | 9/2017 | Kaehler | |
| 2017/0256095 A1* | 9/2017 | Bani-Hashemi | G06T 19/006 |
| 2017/0301145 A1 | 10/2017 | Miller et al. | |
| 2018/0365906 A1 | 12/2018 | Miller | |

OTHER PUBLICATIONS

Bell,"Learning Local Evidence for Shading and Reflectance", Proceedings Eighth IEEE International Conference on Computer Vision. ICCV 2001, Dec. 2001, 12 pages.

Cakmakci,"A Compact Optical See-through Head-Worn Display with Occlusion Support", ISMAR '04 Proceedings of the 3rd IEEE/ACM International Symposium on Mixed and Augmented Reality, 2004, 10 pages.

Coltuc,"Very efficient implementation of max/min filters", Proceedings of the IEEE-EURASIP Workshop on Nonlinear Signal and Image Processing (NSIP'99), Jun. 20, 1999, 4 pages.

Grosse,"Ground truth dataset and baseline evaluations for intrinsic image algorithms", In International Conference on Computer Vision, Oct. 2009, 10 pages.

Hua,"Eyetracked optical see-through head-mounted display as an AAC device", Proc. SPIE 9117, Three-Dimensional Imaging, Visualization, and Display, Jun. 5, 2014, 7 pages.

Karsch,"Depth Extraction from Video Using Non-parametric Sampling—Supplemental Material", University of Ilinois at Urbana-Champaign, Microsoft Research New England and Microsoft Research, http://kevinkarsch.com/, presented at ECCU 2012, Nov. 2012, 11 pages.

Karsch,"Depth Extraction from Video Using Non-parametric Sampling", Pattern Analysis and Machine Intelligence, IEEE Transactions on, 2014., 2014, 14 pages.

Karsch,"Rendering Synthetic Objects into Legacy Photographs", ACM Transactions on Graphics (TOG), Dec. 1, 2011, 12 pages.

Khan,"Image-Based Material Editing", ACM Trans. Graph. 25, Jul. 2006, 10 pages.

Lee,"Geometric Reasoning for Single Image Structure Recovery", In CVPR, Jun. 2009, 8 pages.

Lopez-"Compositing Images Through Light Source Detection", Computers & Graphics 24, 2010, 10 pages.

Maimone,"Computational Augmented Reality Eyeglasses", Proc. IEEE Int'l Symp. Mixed and Augmented Reality (ISMAR 13), 2013, 10 pages.

Maimone,"Pinlight Displays: Wide Field of View Augmented Reality Eyeglasses using Defocused Point Light Sources", SIGGRAPH 2014, 2014, 11 pages.

Neverova,"Lighting Estimation in Indoor Environments from Low-Quality Images", Computer Vision—ECCV 2012—Workshops and Demonstrations, Oct. 2012, 10 pages.

Regan,"Priority Rendering with a Virtual Reality Address Recalculation Pipeline.", Computer Graphics (SIGGRAPH '94 Proceedings), 1994, 8 pages.

"Non-Final Office Action", U.S. Appl. No. 15/133,025, dated Nov. 1, 2017, 12 pages.

"Combined Search and Examination Report", GB Application No. 1619550.5, dated Apr. 24, 2017, 6 pages.

"Final Office Action", U.S. Appl. No. 15/133,025, dated Mar. 8, 2018, 13 pages.

"Notice of Allowance", U.S. Appl. No. 15/133,025, dated Jul. 13, 2018, 8 pages.

* cited by examiner

PHOTOREALISTIC AUGMENTED REALITY SYSTEM

BACKGROUND

Augmented reality systems provide information relevant to a person's current environment by adding rendered images of synthetic objects (e.g., three-dimensional (3D) assets) to a scene of an environment currently being viewed by the person. In one example, a designer or prospective purchaser can add furniture to an image or video of a room and adjust the position of the furniture in the room. The furniture can be added to a video as the designer or prospective purchaser walks around the room, to view different perspectives of the furniture in the room. Hence, the designer or prospective purchaser can select appropriate furniture prior to purchase, without physically moving the furniture in the room.

The augmented reality scene can be experienced through an electronic device, such as a smart phone, where the user is able to see the augmented reality scene when looking at the display of the smart phone while holding the smart phone in the environment. A camera on the smart phone is used for video see-through. Alternatively, the augmented reality scene can be experienced through an optical device, such as a head-mounted display with a lens (e.g., goggles), on which the user sees the augmented reality scene.

To be of practical value in many applications, such as when influencing a design or purchasing decision, the inserted synthetic object must be combined with the real-world environment so that the composite image of the augmented reality scene is photorealistic (e.g., the inserted synthetic object cannot be distinguished from natural objects in the real-world environment). Hence, the inserted synthetic object must match the environment in which it is inserted by accounting for lighting in the environment and occlusion with the background where the object is inserted. Additionally, the environment may need to be adjusted based on the inserted object (e.g., due to shadows cast by the inserted object). Furthermore, processing should be done in real time with no appreciable delay to the user.

Traditional methods of creating rendered images of synthetic objects to be inserted into an augmented reality experience guess at, and therefore do not accurately represent, the lighting of the environment. Consequently, traditional methods are unable to accurately match the lighting of the inserted synthetic object, such as with shading and lighting of the object, to the environment the objected is inserted in. Moreover, traditional methods do not accurately represent the combination of object material properties and the lighting of the environment in real time. Without an accurate real-time representation of lighting in the environment, traditional methods are unable to accurately adjust the environment due to the inserted object, such as by accounting for dynamically cast shadows of the inserted object in a video containing multiple perspectives of the inserted object. Moreover, traditional methods do not support occlusion with the background where the synthetic object is inserted. As a result, traditional methods of creating rendered images of synthetic objects and inserting them into an augmented reality scene (e.g., picture or video) do not meet the real-time requirements of an augmented reality system needed for many applications, such as influencing design and purchasing decisions.

SUMMARY

Techniques and systems are described to generate a photorealistic augmented reality experience in real time. Recently developed methods are leveraged to generate an accurate, real-time lighting representation of an environment, and compensate for lighting of the environment in a composite image. A computing device, such as a client device in an environment obtains (e.g., calculates) a three-dimensional (3D) representation of the environment (e.g., a 3D scan of the environment). The computing device also captures an image of the environment, such as with a camera on the computing device. Using the 3D representation and the image of the environment, the lighting representation of the environment is determined. The lighting representation may include a set of light sources in the environment. The computing device renders a 3D asset (e.g., a synthetic object to be inserted in the composite image of augmented reality scene), such as by shading and lighting pixels of the rendered 3D asset. Furthermore, the computing device generates an occlusion mask based on the rendered 3D asset and the image of the environment. The occlusion mask identifies where the rendered 3D asset blocks the environment and where the environment blocks the rendered 3D asset. The computing device composites the rendered 3D asset and the image of the environment to form the composite image based on the occlusion mask and the representation of lighting. For instance, compositing includes presenting, in the composite image, the rendered 3D asset where the rendered 3D asset blocks the environment, and the image of the environment elsewhere, such as where the environment blocks the rendered 3D asset or where the rendered 3D asset does not block the environment. Furthermore, the computing device adds lighting for the rendered 3D asset (e.g., based on the representation of lighting) to a portion of a background of the composite image, and can mask the portion of the background. The processing can be done in real time, for each frame of the image of the environment captured by the computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
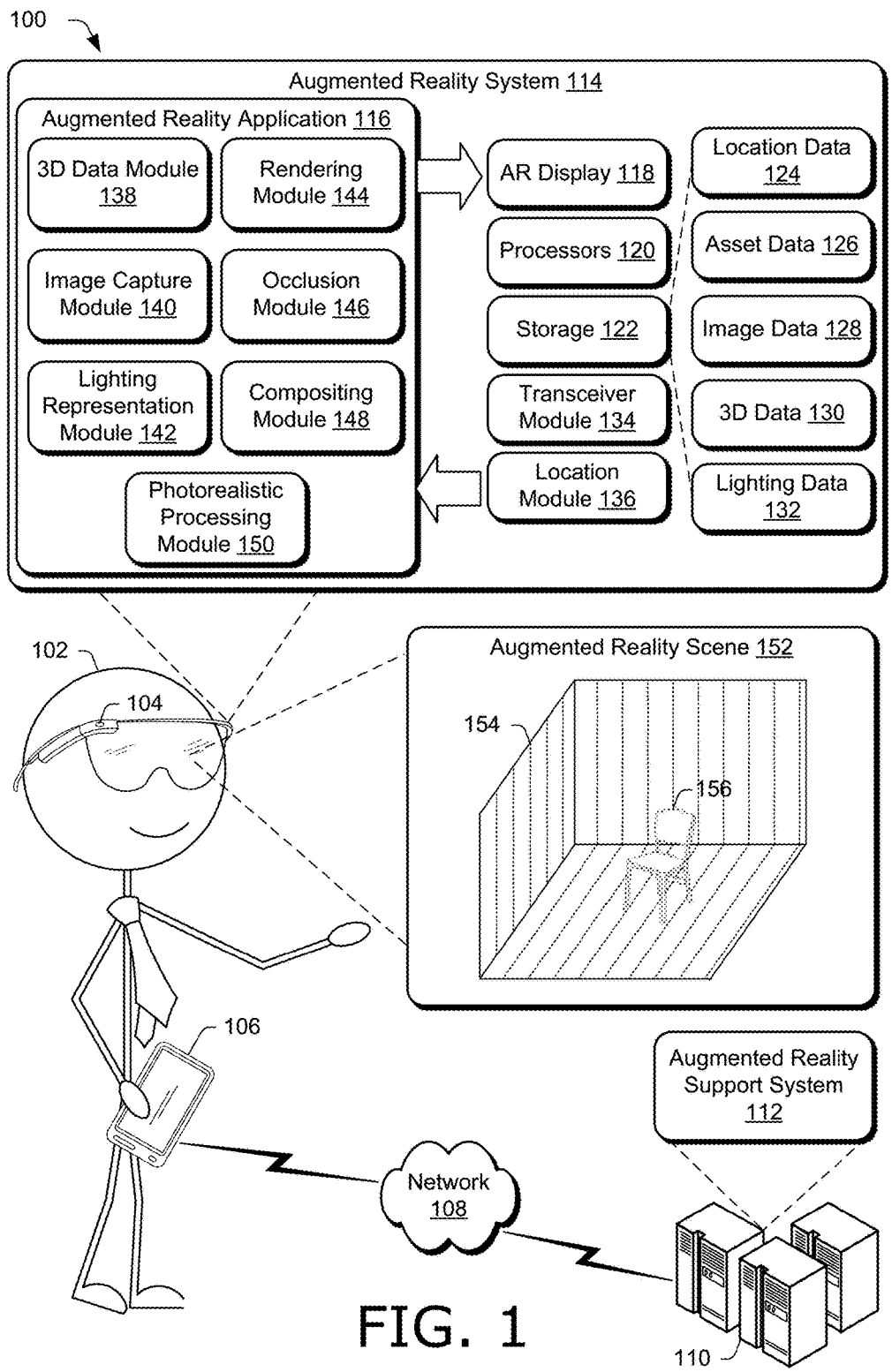
FIG. 1 illustrates a digital medium environment in an example implementation that is operable to employ techniques described herein.

Augmented reality systems provide information relevant to a person's current environment by adding rendered images of synthetic objects (e.g., three-dimensional (3D) assets) to a scene of an environment currently being viewed by the person. In one example, a designer or prospective purchaser can add furniture to an image or video of a room and adjust the position of the furniture in the room to select appropriate furniture prior to purchase, without physically moving the furniture in the room. The furniture can be added to a video as the designer or prospective purchaser walks around the room, to view different perspectives of the furniture in the room.

An augmented reality system may be configured in a variety of ways. For example, the augmented reality system may be configured as glasses to be disposed in front of a user's eyes, goggles that cover the eyes, another type of head-mounted display, a display screen, a video projector, one or more computing devices such as a laptop, desktop, smart phone, tablet, camera, gaming device, and the like, or combinations thereof. Furthermore, an augmented reality system may be configured as a lens disposed over a user's eye or eyes that may not be head-mounted, such as a hand-held monocular or binocular including an augmented reality system. In one example, an augmented reality system is disposed on one or more computing devices in an environment. For instance, a head-mounted or hand-held display may be disposed on a first device, such as in a pair of eyeglasses, and modules of an augmented reality system may be disposed on or in a second device, such as a compositing module implemented by processors of a smart phone communicatively coupled to the eyeglasses. These systems also include functionality to generate the graphic of the synthetic object for visual presentation in conjunction with the real-world scene, e.g., in a composite image including a rendered 3D asset and an image of the environment.

Traditional methods of creating rendered images of synthetic objects to be inserted into an augmented reality experience guess at, and therefore do not accurately represent, the combination of material properties of the object and the lighting of the environment. Consequently, traditional methods are unable to accurately match the lighting of the inserted synthetic object, such as with shading and lighting of the object, to the environment the objected is inserted in. Moreover, traditional methods do not accurately represent the lighting of the environment in real time. Without an accurate real-time representation of lighting in the environment, traditional methods are unable to accurately adjust the environment due to the inserted object, such as by accounting for dynamically cast shadows of the inserted object in a video with multiple perspectives of the inserted object. Moreover, traditional methods do not support occlusion of the background where the synthetic object is inserted. As a result, traditional methods of creating rendered images of synthetic objects and inserting them into an augmented reality scene (e.g., picture or video) do not meet the real-time requirements of an augmented reality system needed for many applications, such as influencing a design or purchasing decision.

Accordingly, this disclosure describes systems and techniques for generating a photorealistic augmented reality experience in real time. In contrast to systems and techniques that do not accurately represent the objects materials and the lighting of the environment (e.g., the real-world scene) in real time, this disclosure leverages systems and techniques to generate an accurate, real-time shading and lighting of the virtual objects and compensate for lighting of the environment in a composite image representing the augmented reality experience. The environment lighting is calculated and its representation can be generated or updated for each frame of an image or video of the environment captured by the computing device. Alternatively, in situations where the lighting does not change, the lighting representation can be generated or updated more slowly than for each frame captured by the computing device. For instance, the lighting representation can be generated or updated over multiple frames.

The computing device obtains (e.g., computes) a 3D representation of the environment (e.g., a 3D scan, point cloud, or mesh of the environment). The 3D representation can be i) captured by the computing device, such as with a 3D scanner, ii) obtained from another computing device, such as a mobile device or another computing device located in the environment or via a network from a server not located in the environment, iii) calculated by the device from a 2D image or representation of the environment, or iv) computed from combinations thereof.

The computing device also captures an image of the environment, such as with a camera on the computing device. The image can be a single frame or multiple frames (e.g., frames of a video) and in one example can be used to compute the 3D representation of the environment. The lighting representation is determined from the 3D representation and the image of the environment, and includes a description of lighting sources in the environment, such as a set of light sources and/or a panoramic image that encodes light based on direction. Hence, lighting for the entire environment is inferred from a partial view of the environment.

The computing device obtains and renders a 3D asset (e.g., a synthetic object to be inserted in the composite image of an augmented reality scene). Rendering the 3D asset can include shading and lighting pixels of the rendered 3D asset, adding shadows, and the like. Furthermore, the computing device generates an occlusion mask based on the rendered 3D asset and the image of the environment for a target insertion point in the composite image (e.g., obtained by a user instruction). The occlusion mask identifies where the rendered 3D asset blocks the environment and where the environment blocks the rendered 3D asset.

The computing device composites the rendered 3D asset and the image of the environment to form the composite image based on the occlusion mask and the representation of lighting. Compositing includes presenting, in the composite image, the rendered 3D asset where the rendered 3D asset blocks the environment, and the image of the environment elsewhere, such as where the environment blocks the rendered 3D asset, where the rendered 3D asset does not block the environment (e.g., where the rendered 3D asset is behind an object in the environment), and combinations thereof. Furthermore, the computing device adds lighting for the rendered 3D asset to a portion of the composite image, such as a portion of a background of the composite image) to generate a photorealistic augmented reality scene.

Consequently, the systems and techniques described herein constitute an improvement over current approaches to generate an augmented reality experience that do not accurately and in real time match lighting and shading of the inserted synthetic object with the environment in which the object is inserted. Rather, the systems and techniques described herein insert rendered graphics of synthetic objects in real time in an augmented reality experience such that the lighting and shading of the inserted objects matches the environment in which they are placed. Hence, a photorealistic augmented reality experience is generated in which inserted synthetic objects are indistinguishable from real-world objects in the environment. Accordingly, the systems and techniques described herein are well suited for influencing design or purchasing decisions, as discussed below in more detail.

Term Examples

"3D Asset" describes a model and material associated with that model so the 3D asset can be rendered and inserted into an augmented reality scene. For instance, a 3D asset of a couch may include a wireframe model of the couch and a description of upholstery for the couch so an image of the couch can be rendered.

"3D Representation" describes an indication of the space of an environment. In one example, the 3D representation is a 3D scan of the environment. The 3D representation can include an image of the environment with a depth indicator at each pixel of the image, a mesh, point cloud, and the like.

"Composite Image" describes an image created by compositing aspects of both a rendered 3D asset and an image of the environment. In one example, rendered graphics of a synthetic object (e.g., a rendered 3D asset) are inserted into an image of the environment in a photorealistic manner to form a composite image.

"Lighting Representation" describes an indication of the light in an environment. The lighting representation can be any suitable type of representation. In one example, the lighting representation includes a description of a set of light sources and a panoramic image that encodes light based on direction. The lighting representation can also include a 3D set of light sources, and include a description of different types of light sources, such as spot lights, area lights, and the like.

"Occlusion Mask" describes any indicator (e.g., a table, map, image, list, and the like) that identifies where a rendered 3D asset inserted into an image of the environment blocks the environment and where the environment blocks the rendered 3D asset. Hence, the occlusion mask describes whether the rendered 3D asset or the environment is closer to the viewer of the augmented reality scene.

"Photorealistic" describes a manner in which a synthetic graphic is rendered and inserted into an image of an environment in a natural way (e.g., accounting for lighting and occlusion) so that the inserted object is indistinguishable from objects in the real-world scene.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one user computing device (e.g., a mobile device). In the example in FIG. 1, user 102 is illustrated as having two computing devices 104 and 106. Computing device 106 depicts a tablet, and computing device 104 depicts a pair of eye glasses (e.g., augmented reality goggles). Computing devices 104 and 106 are example computing devices, and any suitable computing device is contemplated, such as by way of example and not limitation, a mobile phone, tablet, laptop computer, gaming device, goggles, glasses, contact lenses, camera, personal digital assistant, and the like. Furthermore, discussion of one of computing devices 104 and 106 is not limited to that computing device, but generally applies to each of computing devices 104 and 106. Moreover, computing devices 104 and 106 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104 and 106. For example, computing devices 104 and 106 can recognize input as being a mouse input, stylus input, touch input, input provided through a natural user interface, and the like. Thus, computing devices 104 and 106 can recognize multiple types of gestures including touch gestures and gestures provided through a natural user interface.

Figure 6:
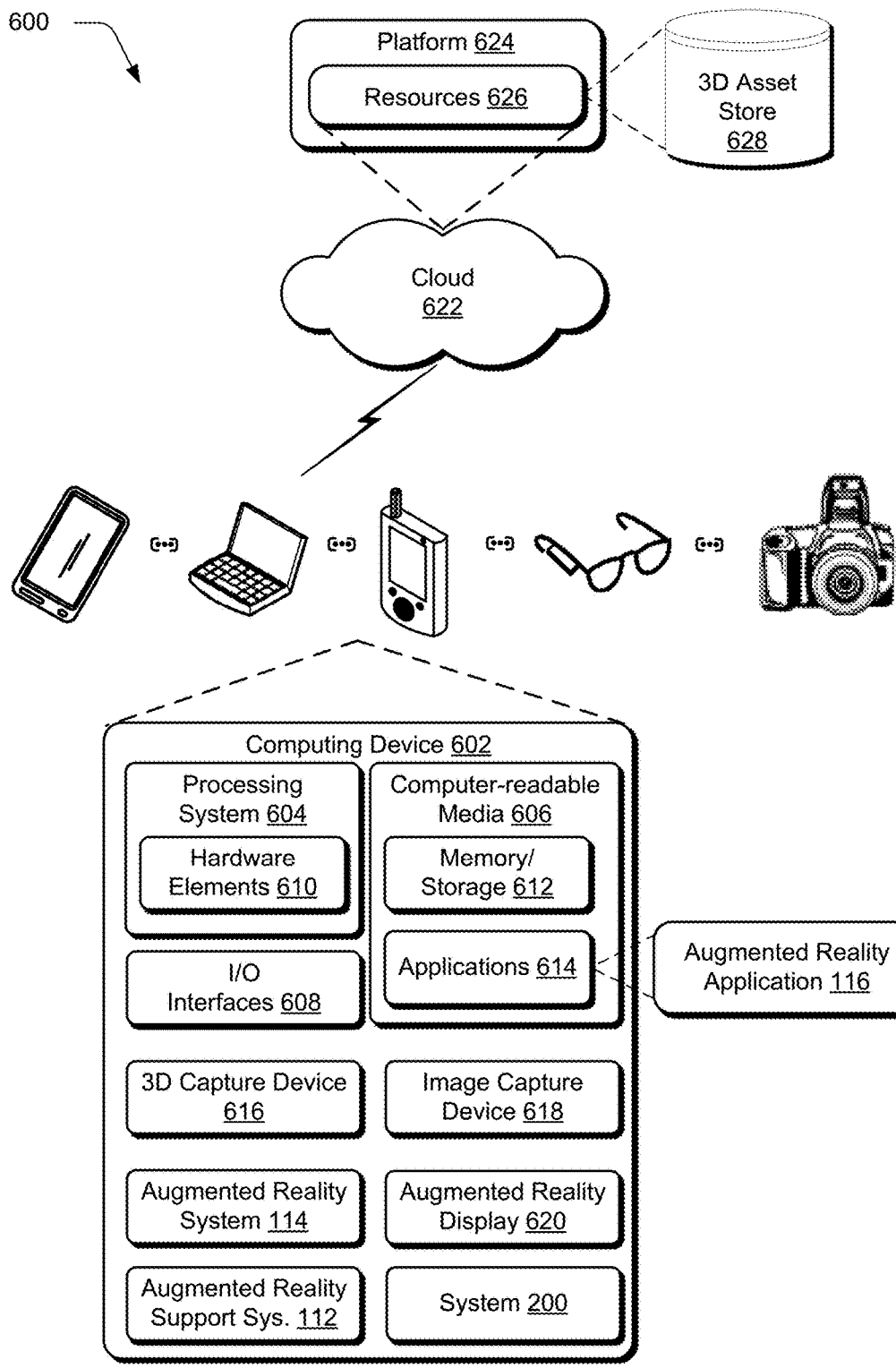
FIG. 6 illustrates an example system including various components of an example device that can be implemented as any type of computing device as described and/or utilized with reference to FIGS. 1-5 to implement aspects of the techniques described herein.

Furthermore, computing devices 104 and 106 may be representative of one or a plurality of different devices, such as one or more devices connected to a network that perform operations "over the cloud" as further described in relation to FIG. 6.

Network 108 communicatively couples computing devices 104 and 106 with server 110 (for clarity, only computing device 106 is illustrated in FIG. 1 as coupled to network 108, though computing device 104 can also be coupled to server 110 via network 108). Network 108 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 110 may include one or more servers or service providers that provide services and/or resources to computing devices 104 and 106. Generally, resources provided by server 110 may be licensed, purchased, or may be made freely available, (e.g., without authentication, license, or account-based access). The resources can include any suitable combination of services and content, such as made available over network 108 by one or more providers. Some examples of services include, but are not limited to, an online shopping service, a photo editing service, a web development and management service, a collaboration service, a social networking service, a messaging service, an advertisement service, a graphics design service, an augmented reality service, and so forth. Content may include various combinations of assets, including videos, ads, audio, multi-media streams, animations, images, web documents, web pages, applications, device applications, text documents, drawings, presentations, user profiles, user preferences, user data, 3D assets including models and materials assigned to the models, and the like.

Server 110 includes augmented reality support system 112 configurable to receive signals from computing devices 104 and 106, process the received signals, and send the processed signals to computing devices 104 and 106 to support an augmented reality experience on, or using, computing devices 104 and 106 (described in more detail below). In one example, augmented reality support system 112 of server 110 includes a copy of augmented reality system 114 of computing devices 104 and 106.

Computing devices 104 and 106 are augmented reality devices and support an augmented reality experience. Thus, computing devices 104 and 106 include augmented reality system 114. For simplicity, only computing device 104 is illustrated in FIG. 1 as including augmented reality system 114, though computing device 106 also includes a copy of augmented reality system 114 (not shown).

Augmented reality system 114 enables user 102 to participate in and control an augmented reality experience. Augmented reality system 114 includes augmented reality application 116 which generates an augmented reality scene (e.g., an image or sequence of frames in a video) for display on augmented reality display 118. Augmented reality display 118 can be any suitable type of display for presenting a photorealistic augmented reality scene. Augmented reality display 118 may be a see-through optic display supporting a direct-view, such as a lens, or an electronic display supporting an indirect view, such as a display screen on a smart phone. Hence, a person may be able to look through augmented reality display 118 presenting a composite image and also may directly view the real-world scene disposed behind augmented reality display 118. Additionally or alternatively, a person can look at augmented reality display 118 to see both an inserted synthetic graphic and the real-world scene as jointly presented on augmented reality display 118 in a composite image.

Augmented reality system 114 includes processors 120. Hence, Augmented reality system 114 may be implemented at least partially by executing instructions stored on storage 122 and executed on processors 120. For instance, processors 120 may execute portions of augmented reality application 116.

Storage 122 can be any suitable type of storage accessible by or contained in augmented reality system 114. Storage 122 stores and provides access to/from memory included in storage 122 for any suitable type of data. For instance, storage 122 includes location data 124 (e.g., data representing a target insertion point of a synthetic graphic in an augmented reality scene), asset data 126 (e.g., data associated with 3D assets, such as models of 3D assets and materials associated with those models), image data 128 (e.g., images of environments captured with augmented reality system 114), 3D data 130 (e.g., data containing 3D representations of environments), and lighting data 132 (e.g., data containing lighting representations of environments).

Furthermore, augmented reality system 114 includes transceiver module 134. Transceiver module 134 is representative of functionality configured to transmit and received data. For instance, data within augmented reality system 114 may be transmitted to server 110 or computing device 106 with transceiver module 134. Furthermore, data can be received from server 110 or computing device 106 with transceiver module 134.

Augmented reality system 114 also includes location module 136. Location module 136 is representative of functionality configured to obtain data indicating a target insertion location for a synthetic object (e.g., rendered 3D asset). In one example, location module 136 is coupled to a user interface to receive user instructions containing a target insertion location. Location module 136 can represent a target insertion location in any suitable way, such as with Cartesian coordinates, polar coordinates, spherical coordinates, vectors, angles, matrices, combinations thereof, and the like.

Augmented reality system 114 also includes augmented reality application 116. Augmented reality application 116 includes 3D data module 138, image capture module 140, lighting representation module 142, rendering module 144, occlusion module 146, compositing module 148, and photorealistic processing module 150. These modules work in conjunction with each other to generate and present augmented reality scene 152 to user 102. Augmented reality scene 152 include a representation of environment 154 (e.g., an empty room illustrated with three walls in FIG. 1) in which user 102 is located. Augmented reality scene 152 also includes chair 156, which is a synthetic object whose graphics have been inserted into augmented reality scene 152. For instance, the empty room of environment 154 in which the user 102 is located does not physically include chair 156. Rather, augmented reality scene 152 is generated by augmented reality system 114, and displayed on an augmented reality display of computing device 104, such as augmented reality display 118.

The 3D data module 138 is representative of functionality configured to obtain a 3D representation of an environment in which computing device 104 is located. The 3D representation can be any suitable type of representation. In one example, the 3D representation is a 3D scan of the environment. The 3D representation can include an image of the environment with a depth indicator at each pixel of the image. Additionally or alternatively, the 3D representation can include a mesh or point cloud. The 3D representation can be obtained once (e.g., a single 3D representation), or multiple times, such as frames of a video sequence at a predetermined rate (e.g., number of frames per second). A user, such as user 102 using computing device 104 can generate the 3D representation when located in the environment (e.g., environment 154). Thus, 3D data module 138 includes or has access to a device configurable to generate a 3D representation, such as a 3D scanner or 3D imaging device.

In one example, the 3D representation obtained by 3D data module 138 is a previously-determined 3D representation, such as determined from another user (other than user 102) who was previously located at the environment. For instance, the environment may correspond to an conference room, office, or frequently-visited environment which as been pre-scanned. Thus, the 3D representation in some cases can be obtained from a server, such as server 110.

Furthermore, the 3D representation may be obtained from an additional user (other than 102) who is located in the environment simultaneously with user 102. For instance, the additional user may also have an augmented reality device with a copy of augmented reality application 116, and provide the 3D representation to 3D data module 138 of computing device 104 operated by user 102.

Image capture module 140 is representative of functionality configured to capture an image of the environment in which computing device 104 is located. The image of the environment can be any suitable type of image, such as a picture, a video, a 360-degree-view image or video, and the like. In one example, the image of the environment includes less than a 360-degree view.

Furthermore, the image of the environment can be any suitable resolution (e.g., number of pixels). In one example, the image of the environment is a high-definition image, e.g., including 1920×1080 pixels in a 16:9 aspect ratio. Additionally or alternatively, the image of the environment can include a standard-definition image, such as an image corresponding to a frame of a standard-definition television format (e.g., with a 4:3 aspect ratio).

Moreover, the image of the environment may be captured as frames of a video sequence at a predetermined rate (e.g., number of frames per second). A user, such as user 102 using computing device 104 can generate the image of the environment when located in the environment (e.g., environment 154). Thus, image capture module 140 includes or has access to a device configurable to capture an image of the environment, such as a camera, video recorder, scanner, and the like.

In one example, frames of the image generated by image capture module 140 are synchronized with frames of the 3D representation obtained by 3D data module 138 by synchronizing the frame rates and sampling times of image capture module 140 and 3D data module 138.

Lighting representation module 142 is representative of functionality configured to determine a representation of lighting in the environment in which computing device 104 is located. In one example, lighting representation module 142 determines the representation of lighting based on the 3D representation obtained by 3D data module 138 and the image of the environment captured by image capture module 140. Hence, the lighting representation is determined from the view captured by the computing device itself (e.g., computing device 104).

Lighting representation module 142 can determine the lighting representation in real time. In one example, lighting representation module 142 uses techniques and systems recently developed and described in U.S. patent application Ser. No. 13/962,204 entitled "Automatic Geometry and Lighting Inference for Realistic Image Editing" to Karsch et al., filed Aug. 8, 2013, the disclosure of which is incorporated herein by reference in its entirety.

Lighting representation module 142 can determine the lighting representation on a frame-by-frame basis (e.g., for each frame of the image of the environment captured by image capture module 140 and/or each frame of the 3D representation obtained by 3D data module 138). Alternatively, lighting representation module 142 can determine the lighting representation at a slower rate than the frame rate of the image of the environment or the 3D representation, such as determining a new representation of lighting for some but not all of the frames of the image of the environment. Moreover, lighting representation module 142 can determine the lighting representation by updating an existing lighting representation (e.g., changing the intensity of a light source) or generating a new lighting representation not based on an old lighting representation.

The lighting representation can be any suitable representation of lighting in the environment in which computing device 104 is located. In one example, the lighting representation includes a description of a set of light sources and a panoramic image that encodes light based on direction. The lighting representation can also include a 3D set of light sources, and include a description of different types of light sources, such as spot lights, area lights, and the like. The lighting representation can be based on an image based lighting (IBL) description using a standard (e.g., published or widely in use) lighting definitions, or any suitable description with any suitable definitions of lights and light sources.

In one example, lighting representation module 142 determines the lighting representation based on a current frame of the 3D representation obtained by 3D data module 138 and a current frame of the image of the environment captured by image capture module 140, and does not determine the lighting representation based on previous frames. However, a better sense of where the light in the environment is coming from can be determined by considering multiple perspectives (e.g., points of view of user 102) in the environment. Hence, lighting representation module 142 can also determine the lighting representation based on a history of multiple images of the environment from image capture module 140 and multiple 3D representations of the environment from 3D data module 138. The history may encompass a window of time and therefore include multiple perspectives, such as looking forwards, backwards, and to the sides. Thus the lighting representation can accurately indicate where light is coming from in a vicinity of a target insertion point of a synthetic object in the environment.

Rendering module 144 is representative of functionality configured to obtain and render a 3D asset. The 3D asset can be obtained in any suitable way, such as generated on a client device, e.g., computing devices 104 and 106, or obtained from a server, e.g., server 110. A 3D asset can include a model of the asset and materials assigned to the model. For instance, a 3D asset of a couch may include a wireframe model of the couch and a description of upholstery for the couch.

A 3D asset can be any suitable type of asset. For instance, the 3D asset may be helpful, humorous, entertaining, and so forth. For example, an augmented reality system can display directional arrows and textual instructions over streets or down hallways to help a person navigate to a requested destination. In another example, recommended tolerances or detailed installation instructions for an automotive part are displayed to help a car mechanic In yet another example, an augmented reality system can project the results of a planned structural remodel or the introduction of new furniture into a real-world view of an interior of a building. A 3D asset can further be used for amusement, such as displaying amusing comments or recent social media communications, for example, over the heads of friends and coworkers. In another example, a rendered 3D asset can be inserted into an augmented reality scene to assist in design and purchasing decisions.

Rendering module 144 renders the 3D asset to produce a rendered 3D asset (e.g., an image or graphics of the 3D asset). For instance, chair 156 is an example of a rendered 3D asset. Rendering module 144 renders the 3D asset using a synthetic camera which matches the position used to capture the image of the environment relative to the environment. A user, such as user 102, can configure computing device 104 to display the rendered 3D asset at a desired location (e.g., a target insertion point obtained via a user instruction) in augmented reality scene 152. Rendering module 144 renders the 3D asset according to the targeted insertion point by adjusting the light on the rendered 3D asset based on the lighting description. For instance, rendering module 144 can shade pixels of the rendered 3D asset, add light to the surface of the rendered 3D asset, add a shadow on the rendered 3D asset, and combinations thereof, to match the lighting of the rendered 3D asset to the lighting of the environment viewed from the position used to capture the image of the environment.

Rendering module 144 renders the 3D asset based on a combination of material properties of the 3D asset and the lighting representation of the environment from lighting representation module 142 so that the rendered 3D asset is photorealistic when placed in the environment. In one example, a physically based rendering approach is used. For instance, material properties can be modeled to describe the flow of light in the real world using any suitable models, such as reflectance distribution functions, reflection parameters such as specular intensity, gloss, and the like, metallicity derived from empirical measurements, roughness of microsurfaces, Fresnel conditions, and combinations thereof. By modeling the material properties with a physically based rendering approach and using an accurate lighting representation of the environment from lighting representation module 142, rendering module 144 guarantees the rendered 3D asset will look photorealistic when inserted into the environment.

Occlusion module 146 is representative of functionality configured to generate an occlusion mask identifying where the rendered 3D asset blocks the environment and where the environment blocks the rendered 3D asset. Occlusion module 146 is configured to receive instructions to place the rendered 3D asset in the environment, such as user instructions including a target insertion point, determine whether the rendered 3D asset blocks the environment or vice versa, and generate an occlusion mask.

The occlusion mask can be any suitable format. In one example, the occlusion mask includes an indicator of whether the rendered 3D asset blocks the environment or whether the environment blocks the rendered 3D asset for each pixel of the image of the environment. Additionally or alternatively, the image of the environment can be broken into multiple regions each containing multiple pixels, and the occlusion mask includes an indicator of whether the rendered 3D asset blocks the environment or whether the environment blocks the rendered 3D asset for each region.

Furthermore, the occlusion mask can be any suitable size. In one example, an indicator of whether the rendered 3D asset blocks the environment or whether the environment blocks the rendered 3D asset includes a binary indicator, and a plurality of binary indicators are compressed into a sequence to form the occlusion mask. Moreover, the compressed sequence can be encrypted, so that the occlusion mask can be used only when it is properly decrypted. Thus, the occlusion mask can be made secure to prevent a hacker (e.g., undesired or unregistered user) from placing an undesirable graphic in the augmented reality scene, such as augmented reality scene 152.

Moreover, the size of the occlusion mask can depend on the complexity of the rendered 3D object and/or the complexity of the environment. For instance, the occlusion mask involving a partially obscured tree (e.g., a Christmas tree) requires more information than the occlusion mask of inserting a graphic of a box in an empty room due to the complexity of the shape of the tree compared to the complexity of the shape of the box.

The occlusion module 146 can generate the occlusion mask at any suitable rate. In one example, occlusion module 146 generates the occlusion mask for each frame of the image of the environment captured by image capture module 140 and/or each frame of the 3D representation obtained by 3D data module 138.

Compositing module 148 is representative of functionality configured to composite the rendered 3D asset, such as adjusted for lighting and shading in rendering module 144, and the image of the environment from image capture module 140 to form a composite image. The compositing is based on the occlusion mask by presenting the rendered 3D asset where the rendered 3D asset blocks the environment and the image of the environment elsewhere, such as where the environment blocks the rendered 3D asset and where the environment is unobstructed by the rendered 3D asset. Compositing module 148 can use a model of the background of the environment, the depth of the scene, and the depth of the rendered 3D asset and presents the rendered 3D asset or the environment depending on which is closer (to the viewer of the composite image).

Furthermore, compositing module 148 can determine where shadows are cast in the environment, such as shadows cast by the inserted graphic. Thus, compositing module can adjust the environment of the composite image by inserting shadows in the environment as well as on the inserted graphic. Accordingly, compositing module 148 may have access to the lighting representation determined by lighting representation module 142 and the target insertion point, in addition to any other signals to determine the appropriate location and shading for shadows.

Photorealistic processing module 150 is representative of functionality configured to mask light of the environment in the composite image and add lighting to the composite image. In one example, photorealistic processing module 150 masks a background of the composite image where a foreground is visible and adds light of the rendered 3D asset in the foreground. Thus, photorealistic processing module 150 is also supplied a copy of the occlusion mask generated by occlusion module 146. Additionally or alternatively, photorealistic processing module 150 can add lighting for the rendered 3D asset (e.g., based on the representation of lighting used to render a 3D asset) to a portion of a background of the composite image, and mask the portion of the background before adding the lighting.

In another example, photorealistic processing module 150 compensates for a halo in the image of the environment around the rendered 3D asset based on compensation techniques and systems described in U.S. patent application Ser. No. 15/133,025 entitled "Image Compensation for an Occluding Direct-View Augmented Reality System" to Miller, filed Apr. 19, 2016, the disclosure of which is incorporated herein by reference in its entirety.

Photorealistic processing module 150 can process each composite image provided to it, and therefore operate on a frame-by-frame basis (e.g., for each frame of the image of the environment captured by image capture module 140 and/or each frame of the 3D representation obtained by 3D data module 138). The images produced by photorealistic processing module 150 are supplied to an augmented reality display on the computing device, such as the lenses on computing device 104 or the display screen on computing device 106, which are examples of augmented reality display 118.

The modules included in augmented reality application 116 can be implemented electronically, optically, or a combination thereof. For instance, in one example, the augmented reality scene 152 can be experienced through an electronic device, such as computing device 106 (e.g., a smart phone or tablet), where the user is able to see the augmented reality scene when looking at the display of the device while holding the device in the environment. A camera on the device can be used for video see-through.

Alternatively, the augmented reality scene 152 can be experienced through an optical device, such as computing device 104 including a head-mounted lens on which the user sees the augmented reality scene and through which the user sees the real-world environment.

Having considered an example digital medium environment, consider now a discussion of an example system usable to generate a photorealistic augmented reality experience in real time.

Example Photorealistic Augmented Reality System

Figure 2:
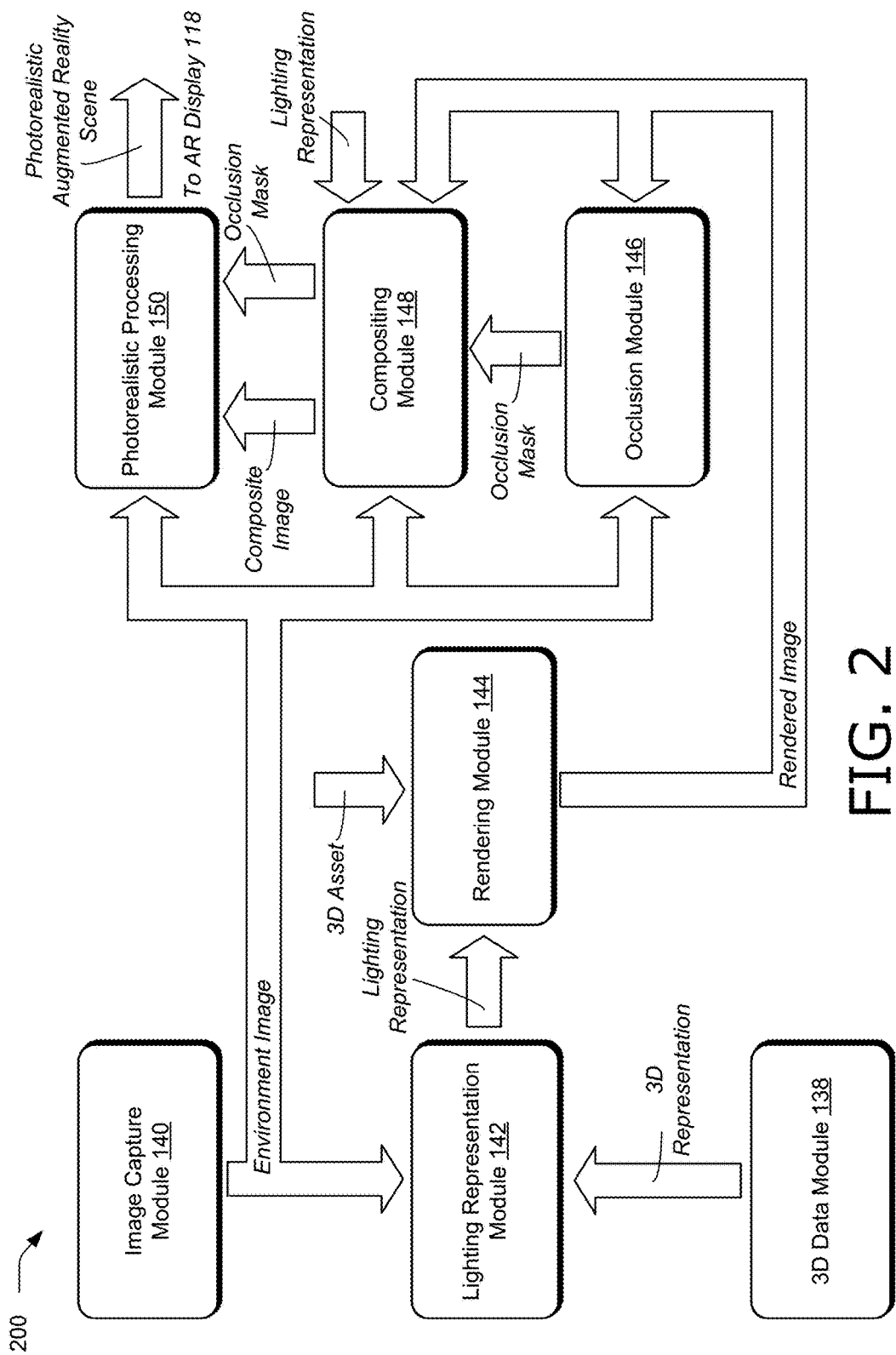
FIG. 2 illustrates an example system usable to generate a photorealistic augmented reality experience in real time in accordance with one or more aspects of the disclosure.

FIG. 2 illustrates an example system 200 usable to generate a photorealistic augmented reality experience in real time in accordance with aspects of the disclosure. In this implementation, system 200 includes the modules of augmented reality application 116 as described in FIG. 1, e.g., 3D data module 138, image capture module 140, lighting representation module 142, rendering module 144, occlusion module 146, compositing module 148, and photorealistic processing module 150. System 200 is one example of augmented reality system 114 that can be constructed using the modules of augmented reality application 116. For instance, signals can be redefined, and modules can be modified, combined, or divided to form a modified system, without altering the functionality of system 200. Accordingly, such modified systems are considered to be within the scope of the disclosure.

Furthermore, for simplicity system 200 is limited to the modules of augmented reality application 116 and a description of some of their interconnects. System 200 can, however, include any suitable signals and communications between modules omitted for simplicity. Such signals may include system clocks, counters, frame indicators, reset signals, user inputs, and the like. System 200 can operate in real time. Accordingly, signals can be calculated by the modules of system 200 and communicated between the modules of system 200 without significant delay, so that a photorealistic experience (e.g., a video, image, and the like) can be consumed by a user without perceptible delay to the user. For instance, a lighting representation can be determined, a 3D asset can be rendered, and a composite image can be generated without perceptible delay to a user for each frame of a video sequence. Accordingly, objects can be inserted and edited in real time in an augmented reality environment in a photorealistic fashion using system 200.

Moreover, system 200 can be implemented on any suitable device or devices. In one example, system 200 is implemented on one computing device, such as a user computing device (e.g., computing device 104 or 106 in FIG. 1). In another example, system 200 is implemented on more than one device. For instance, parts of system 200 can be implemented by a first user computing device, such as computing device 104 or 106 in FIG. 1, and other parts of system 200 can be implemented by an additional computing device or devices. In one example, a remote server implements parts of system 200, such as server 110 in FIG. 1. The server is remote because it is not collocated with the first user computing device. The server may be configured to receive signals of system 200 from the first user computing device, process the received signals, such as with augmented reality support system 112, and transmit results of the processing back to the first user computing device (e.g., computing device 104 and/or 106). Hence, augmented reality support system 112 of server 110 in FIG. 1 may include system 200.

Additionally or alternatively, parts of system 200 can be implemented by an additional computing device that is collocated with the first user computing device. For instance, one of computing device 104 and 106 may be the first user computing device, and the other of computing device 104 and 106 may be the additional, collocated computing device. The first user computing device and the additional computing device may be operated by one or more users. Hence, system 200 provides for multiple users within an environment to share data included in system 200. For instance, the lighting representation determined by lighting representation module 142 may be based on multiple lighting representations generated by respective multiple computing devices at the environment and shared among the multiple computing devices.

Moreover, system 200 may be implemented electronically, optically, or with a combination of electrical and optical devices and methods. For instance, the lighting representation may be determined electronically (e.g., with electrical circuits such as semiconductors) and the compositing and/or photorealistic processing may be done with a combination of electrical circuits and optics (e.g., lenses and see-through displays).

Image capture module 140 captures an image of the environment. The image of the environment is shared with lighting representation module 142, occlusion module 146, compositing module 148, and photorealistic processing module 150.

The 3D data module 138 obtains a 3D representation of the environment. For instance, the 3D data module may generate a 3D representation of the environment, obtain a previously-generated 3D representation, or combine a 3D representation generated by 3D data module 138 and a 3D representation obtained by 3D data module 138 from another computing device. The 3D representation can be any suitable type of 3D representation, such as a 3D scan with depth indicators, point cloud, or mesh of the environment. The 3D data module 138 provides the 3D representation to lighting representation module 142.

Lighting representation module 142 determines a representation of lighting in the environment based on the representation of lighting from 3D data module 138 and the image of the environment form image capture module 140. Additionally or alternatively, lighting representation module 142 can determine the lighting representation based on additional lighting representations provided by additional respective computing devices than the computing device implementing lighting representation module 142, or additional lighting representations previously determined by the computing device implementing lighting representation module 142. Lighting representation module 142 provides the lighting representation to rendering module 144 and compositing module 148.

Rendering module 144 renders a 3D asset based on the representation of lighting to produce a rendered 3D asset. The rendered 3D asset can include shading and/or lighting at least some pixels of the rendered 3D asset. Furthermore, rendering module 144 may determine that the rendered 3D asset casts a shadow on itself, and thus renders the 3D asset with a shadow introduced by the rendered 3D asset itself. The rendered 3D asset can be any suitable form, such as a rendered image including graphics corresponding to the synthetic object (e.g., the 3D asset). The rendering module 144 can implement any suitable processing to match the lighting of the rendered 3D asset with the environment in which the rendered 3D asset is placed.

Furthermore, rendering module 144 may be configured to accept user instructions, such as an instruction to relocate the rendered 3D asset in the environment of the augmented reality scene. In one example, rendering module 144 is configured to automatically render the 3D asset and produce a rendered image responsive to receiving user instructions to move, rotate, change the color of, the texture of, or otherwise modify the 3D asset. In another example, rendering module 144 is configured to provide a user-selectable option that is selectable to confirm to render the 3D asset (e.g., once all changes have been entered by the user). Rendering module 144 provides a rendered image (e.g., the rendered 3D asset) to occlusion module 146 and compositing module 148.

Occlusion module 146 generates an occlusion mask identifying where the rendered 3D asset blocks the environment and where the environment blocks the rendered 3D asset. Occlusion module 146 is configured to receive instructions to place the rendered 3D asset in the environment, such as user instructions including a target insertion point, determine whether the rendered 3D asset blocks the environment and vice versa for the target insertion point, and generate an occlusion mask. The occlusion mask can be generated by the occlusion module 146 with a model of the background of the environment, depths of the scene, and depths of the rendered 3D asset. Hence, though not shown in FIG. 2, occlusion module 146 may have access to the 3D representation determined by 3D data module 138, or any other suitable depth information or 3D information to generate the occlusion mask. Occlusion module 146 provides the occlusion mask to compositing module 148 and photorealistic processing module 150.

Compositing module 148 composites the rendered 3D asset adjusted for lighting and shading in rendering module 144 and the image of the environment from image capture module 140 to form a composite image. The compositing is based on the occlusion mask and the representation of lighting. Compositing can include presenting the rendered 3D asset where the rendered 3D asset blocks the environment, and the image of the environment elsewhere, such as where the environment blocks the rendered 3D asset, where the rendered 3D asset does not block the environment, combinations thereof, and the like. Furthermore, compositing module 148 can adjust the environment of the composite image by inserting shadows in the environment as well as on the inserted graphic in the composite image, based on the representation of lighting. Compositing module 148 supplies the composite image to photorealistic processing module 150.

Photorealistic processing module 150 adds lighting for the rendered 3D asset based on the representation of lighting to the composite image (e.g., to any suitable portion of the environment of the composite image, such as a portion of a background of the composite image or a portion of an object in a foreground of the composite image). Additionally or alternatively, photorealistic processing module 150 masks light of the environment in the composite image. For instance, photorealistic processing module 150 masks a background of the composite image where a foreground is visible and adds light of the rendered 3D asset in the foreground. Photorealistic processing module 150 can provide any suitable type of processing to match the lighting of the inserted synthetic object to the lighting of the environment, and to modify the lighting of the environment in response to changes caused by the inserted synthetic object, e.g., shadows, reflections, glares, and the like. In one example, photorealistic processing module 150 compensates for a halo in the image of the environment around the rendered 3D asset.

Photorealistic processing module 150 provides a photorealistic augmented reality scene for consumption by a suitably configured computing device, such as computing device 104 or 106 in FIG. 1. For instance, the photorealistic augmented reality scene provided by photorealistic processing module 150 can be viewed on a display of the computing device, e.g., an electronic or optical display, such as augmented reality display 118 in FIG. 1.

The modules in system 200 can operate at any suitable rate. In one example, rates and phases of image capture module 140 and 3D data module 138 are synchronized, and the modules of system 200 process signals at a frame rate, e.g., for each frame of a video sequence captured by image capture module 140. In some situations where the lighting is known not to change quickly, however, such as in a conference room setting during a meeting, lighting representation module 142 may update the light representation at a rate lower than the frame rate, such as for every $N^{th}$ frame of a video sequence captured by image capture module 140, where N is an integer (e.g., a power of two). The value of N can be adjusted during operation of system 200 (e.g., based on the complexity of the environment, the rendered 3D asset, a detected change in perspective (e.g., location of a device implementing system 200), or combinations thereof).

System 200 constitutes an improvement over current systems that generate an augmented reality experience and do not accurately and in real time match lighting and shading of an inserted synthetic object with the environment in which the object is inserted. Rather, system 200 inserts rendered graphics of synthetic objects in real time in an augmented reality experience such that the lighting and shading of the inserted objects matches the environment in which they are placed. Hence, a photorealistic augmented reality experience is generated in which inserted synthetic objects are indistinguishable from real-world objects in the environment. Accordingly, system 200 is well suited for many applications that require photorealistic augmented reality scenes, such as influencing design and purchasing decisions.

Having considered an example system 200, consider now a discussion of an example augmented reality environment in accordance with one or more aspects of the disclosure.

Example Augmented Reality Environment

Figure 3:
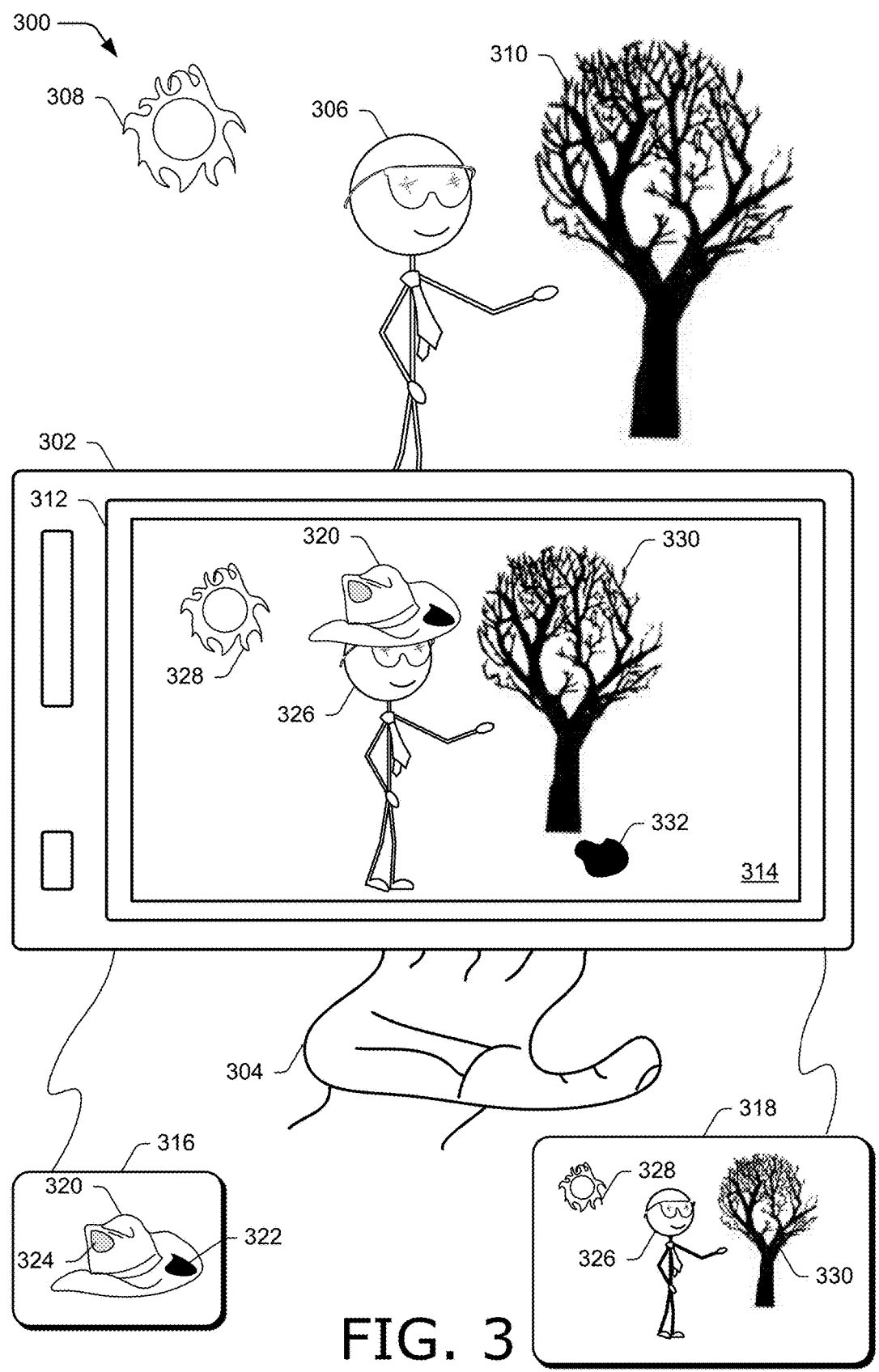
FIG. 3 illustrates an example augmented reality environment in accordance with one or more aspects of the disclosure.

FIG. 3 is an illustration of an example augmented reality environment 300 in accordance with one or more aspects of the disclosure. Environment 300 includes computing device 302. Computing device 302 is an augmented reality device (e.g., it includes system 200 to support an augmented reality experience and display a composite image). In the example in FIG. 3, computing device 302 is a handheld device held by hand 304 of a first user located in environment 300. Computing device 106 in FIG. 1 is an example of computing device 302 in FIG. 3.

The example augmented reality environment 300 includes a second user 306. For instance, second user 306 may be a subject of a photographic or video being taken by the first user operating computing device 302. The sun 308 and a tree 310 are located in environment 300 and together with second user 306 form a real-world scene.

Computing device 302 is an augmented reality device and includes augmented reality display 312. Augmented reality display 312 is configurable to display a composite image 314 including an image of environment 300, such as captured by a camera on computing device 302, and a rendered image of a synthetic object (e.g., a rendered 3D asset). For instance, computing device 302 generates rendered image 316 and environment image 318.

In the example in FIG. 3, the first user of computing device 302 has selected a 3D asset of a hat which has been rendered as rendered image 316 and stored on computing device 302. Hence, rendered image 316 contains a synthetic graphic 320 of a hat. Moreover, synthetic graphic 320 includes shadow 322 and lighting 324. Shadow 322 and lighting 324 have been added to rendered image 316 based on the sun 308 being identified as a light source of environment 300 and a target insertion location indicated by the first user (e.g., via a user instruction or selection in a user interface). Hence, shadow 322 on synthetic graphic 320 is cast by synthetic graphic 320 itself.

Environment image 318 is an image of the environment (including the sun 308, tree 310, and second user 306). Hence, environment image 318 includes image 326 of second user 306, image 328 of the sun 308, and image 330 of tree 310, which have been captured by a camera on computing device 302.

Rendered image 316 and environment image 318 are composited into composite image 314 by computing device 302 to provide an augmented reality experience. In addition to including image 326 of second user 306, image 328 of the sun 308, and image 330 of tree 310, composite image 314 also includes rendered image 316, including synthetic graphic 320 with shadow 322 and lighting 324. Composite image 314 can be a photograph or a frame of a video sequence.

Rendered image 316 can be moved within composite image 314 and placed at a target location. For instance, second user 306 in the real-world scene is not wearing a hat. However, rendered image 316 includes synthetic graphic 320 with shadow 322 and lighting 324, so that an image of a hat that has been placed on the head of image 326 in composite image 314 by the first user operating computing device 302.

Because computing device 302 is an augmented reality device and includes an augmented reality system configured in accordance with the techniques described herein (e.g., augmented reality system 114 and system 200), rendered image 316 is inserted into composite image 314 in a photorealistic manner so that a typical observer of composite image 314 would not be able to determine that rendered image 316 has been inserted into the composite image and is not part of the real-world scene. For instance, rendered image 316 has been inserted in front of, rather than behind, image 326. Moreover, rendered image 316 includes shadow 322 and lighting 324, as described above. Lighting 324 represents a bright spot on rendered image 316, such as caused by direct light impingement on rendered image 316. Furthermore, shadow 332 has been added on the ground of the environment in composite image 314. Shadow 332 is cast by an inserted graphic (e.g., rendered image 316).

Accordingly, a photorealistic augmented reality experience for the first user of computing device 302 is enabled in FIG. 3. The first user can simultaneously see the real-world scene (e.g., the sun 308, second user 306, and tree 310) as well as composite image 314 while the first user is holding computing device 302 to image the real-world scene. As the first user moves in environment 300, computing device 302 can automatically update the insertion of rendered image 316 (e.g., adjust appropriate lighting, shading, occlusion, and the like) so that composite image 314 remains photorealistic.

Having considered example systems and environments, consider now a discussion of example procedures for generating a photorealistic augmented reality experience in real time in accordance with one or more aspects of the disclosure.

Example Procedures

Figure 4:
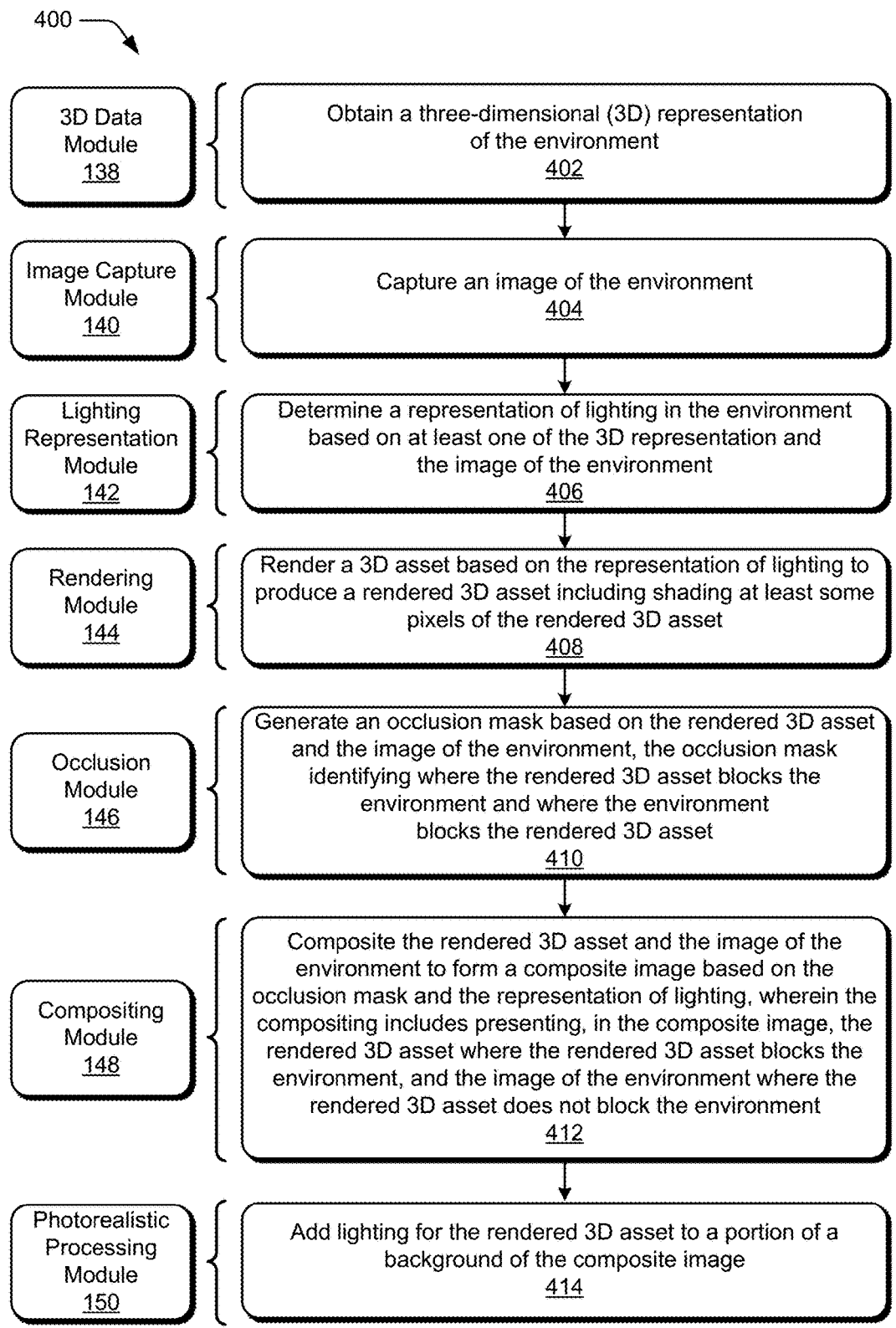
FIG. 4 illustrates a flow diagram depicting an example procedure in accordance with one or more aspects of the disclosure.

FIG. 4 illustrates an example procedure 400 for generating a photorealistic augmented reality experience in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as computing device 104 or 106 of FIG. 1 that makes use of an augmented reality system, such as system 200 or augmented reality system 114. An augmented reality system implementing procedure 400 may be an independent application that has been installed on the computing device, a service hosted by a service provider that is accessible by the computing device, a plug-in module to the computing device, or combinations thereof.

The 3D data module 138 of a computing device obtains a 3D representation of the environment (block 402). In one example, the 3D representation is a 3D scan, point cloud, or mesh of the environment. Furthermore, the 3D representation can be updated at any suitable rate, such as for each frame of an image of the environment captured by image capture module 140. In one example, the 3D representation is computed from a 2D image of the environment, such as an image of the environment captured by image capture module 140 at block 404.

Image capture module 140 of the computing device captures an image of the environment (block 404). The image of the environment can include multiple frames. The multiple frames can correspond to multiple perspectives of the environment. For instance, the image of the environment can include a video sequence shot from different points of view throughout the environment.

Lighting representation module 142 of the computing device determines a representation of lighting in the environment based on at least one of the 3D representation and the image of the environment (block 406). In one example, lighting representation module 142 determines the representation of lighting based on the 3D representation and the image of the environment. The representation of lighting can be determined for each frame of the image of the environment that is captured by the computing device. Furthermore, the representation of lighting can be determined from multiple frames of the image of the environment, such as using a history of frames corresponding to a window of time. The representation of lighting indicates where light is coming from in a vicinity of a target insertion point of the rendered 3D asset in the environment.

In one example, the representation of lighting is determined by obtaining a previously-determined representation of lighting of the environment, such as from a server or another computing device collocated in the environment with the computing device that determines the representation of lighting in block 406. For instance, determining the representation of lighting can include receiving an additional representation of lighting from an additional computing device located in the environment, and merging the additional representation of lighting with a representation of lighting determined by the computing device.

Furthermore, the image of the environment can be sent to a server, the lighting representation can be generated on the server, and received from the server on the computing device, such as by lighting representation module 142. In one example, the representation of lighting includes individual light sources and a panoramic image that encodes light based on direction.

Rendering module 144 of the computing device renders a 3D asset based on the representation of lighting to produce a rendered 3D asset including shading at least some pixels of the rendered 3D asset (block 408). Furthermore, the rendered 3D asset can include added light, a shadow, shading, and any other suitable artifact to match the light on the rendered 3D asset to lighting of the environment at a targeted insertion point. In one example, rendering module 144 renders the 3D asset based on the representation of lighting and material properties of the 3D asset, such as texture, metallicity, roughness resulting from microsurfaces, and the like. For instance, rendering module 144 can render the 3D asset based on a physically based rendering approach.

Occlusion module 146 of the computing device generates an occlusion mask based on the rendered 3D asset and the image of the environment (block 410). The occlusion mask identifies where the rendered 3D asset blocks the environment and where the environment blocks the rendered 3D asset. In one example, the occlusion mask is generated by updating a previously-generated occlusion mask, including changing at least one binary indicator indicating where the rendered 3D asset blocks the environment or where the environment blocks the rendered 3D asset.

Compositing module 148 composites the rendered 3D asset and the image of the environment to form a composite image based on the occlusion mask and the representation of lighting (block 412). The compositing includes presenting, in the composite image, the rendered 3D asset where the rendered 3D asset blocks the environment, and the image of the environment where the rendered 3D asset does not block the environment. The compositing can include determining a shadow in the environment caused by the rendered 3D asset, modifying the image of the environment based on the shadow to produce a modified environment image, and presenting the modified environment image in the composite image.

In one example, compositing is done electronically by presenting on a display pixels of the rendered 3D asset where the rendered 3D asset blocks the environment and pixels of the image of the environment elsewhere including where the environment blocks the rendered 3D asset. Additionally or alternatively, the compositing can be done optically with a lens that supports the occlusion mask.

Furthermore, compositing module 148 can composite the rendered 3D asset and the image of the environment for each frame of the image of the environment, and the lighting representation module can determine a new representation of lighting for some but not all of the frames of the image.

Photorealistic processing module 150 of the computing device adds lighting for the rendered 3D asset to a portion of a background of the composite image (block 414). The lighting added can include lighting based on the representation of lighting (e.g., lighting that has been added to a 3D asset based on the representation of lighting when the 3D asset is rendered). In one example, adding lighting includes masking the portion of the background and compensating for a halo in the image of the environment around the rendered 3D asset.

In one example, the obtaining, the capturing, the determining, the rendering, the generating, the compositing, and the adding light are done in real time, with no observable delay to a user of the computing device.

Figure 5:
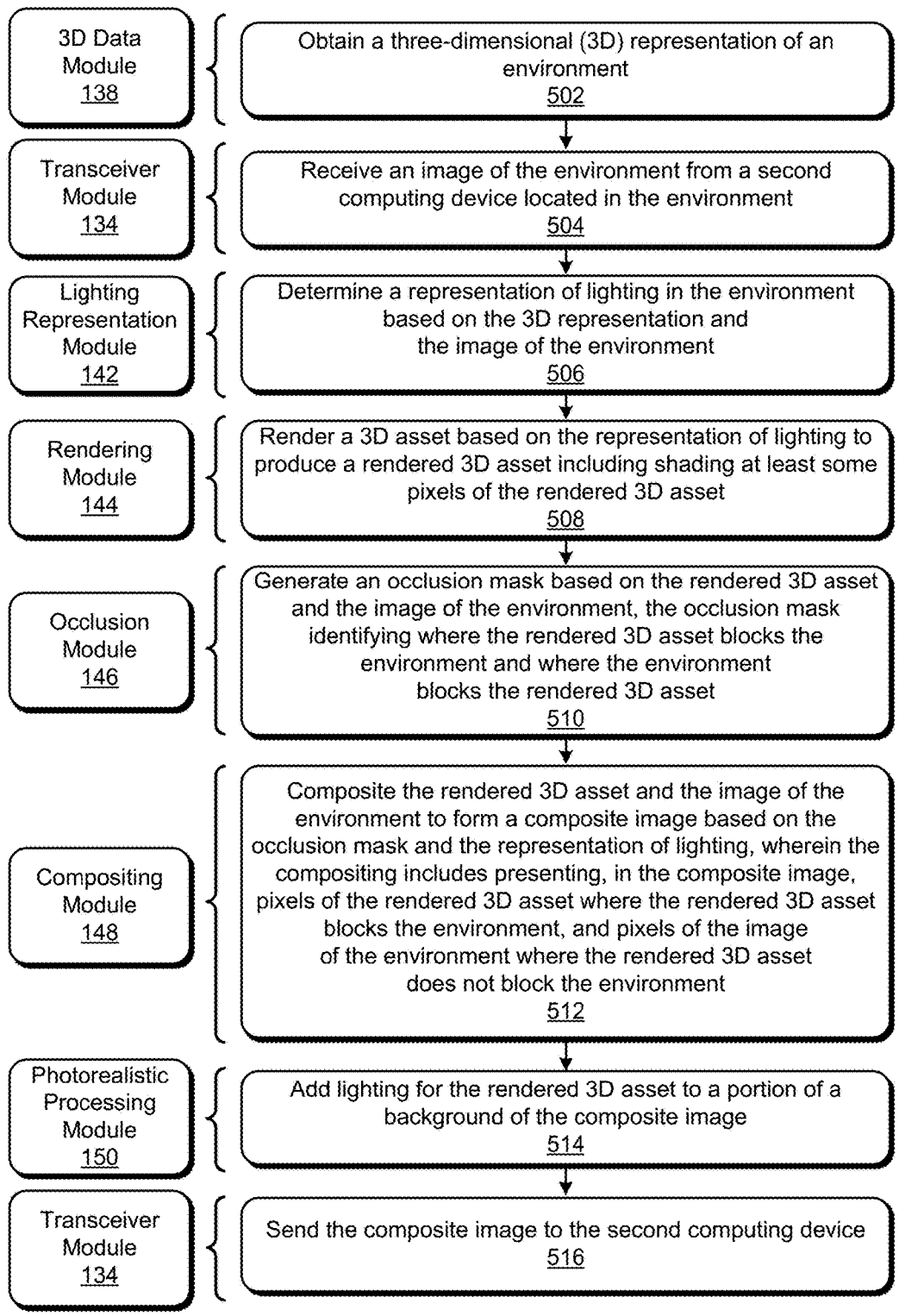
FIG. 5 illustrates a flow diagram depicting an example procedure in accordance with one or more aspects of the disclosure.

FIG. 5 illustrates an example procedure 500 for generating a photorealistic augmented reality experience in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as server 110 of FIG. 1 that makes use of an augmented reality system, such as system 200 and augmented reality system 114. An augmented reality system implementing procedure 400 may be an independent application that has been installed on the computing device, a service hosted by a service provider that is accessible by the computing device, a plug-in module to the computing device, or combinations thereof.

The 3D data module 138 of a first computing device obtains a three-dimensional (3D) representation of the environment (block 502). In one example, the first computing device is not located in the environment (e.g., it is a remote computing device from the environment). For instance, the first computing device can be a remote server.

Transceiver module 134 of the first computing device receives an image of the environment from a second computing device located in the environment (block 504). For instance, the second computing device can capture and transmit the image of the environment to the first computing device.

Lighting representation module 142 of the first computing device determines a representation of lighting in the environment based on the 3D representation and the image of the environment (block 506). In one example, transceiver module 134 also receives an additional image of the environment from a third computing device located in the environment, and the representation of lighting is further based on the additional image.

Rendering module 144 of the first computing device renders a 3D asset based on the representation of lighting to produce a rendered 3D asset including shading at least some pixels of the rendered 3D asset (block 508).

Occlusion module 146 of the first computing device generates an occlusion mask based on the rendered 3D asset and the image of the environment (block 510). The occlusion mask identifies where the rendered 3D asset blocks the environment and where the environment blocks the rendered 3D asset.

Compositing module 148 of the first computing device composites the rendered 3D asset and the image of the environment to form a composite image based on the occlusion mask and the representation of lighting (block 512). Compositing includes presenting, in the composite image, pixels of the rendered 3D asset where the rendered 3D asset blocks the environment, and pixels of the image of the environment where the rendered 3D asset does not block the environment. Additionally or alternatively, compositing module 148 can present the image of the environment where the environment blocks the rendered 3D asset.

Photorealistic processing module 150 of the first computing device adds lighting for the rendered 3D asset to a portion of a background of the composite image (block 514). The lighting added by photorealistic processing module 150 can be based on the representation of lighting used to render a 3D asset, lighting of the 3D asset before the 3D asset is rendered, or combinations thereof. Moreover, photorealistic processing module 150 can compensate for a halo in the image of the environment around the rendered 3D asset. Additionally or alternatively, photorealistic processing module 150 can mask the portion of the background before adding the lighting of the rendered 3D asset to the portion of the background.

Transceiver module 134 of the first computing device sends the composite image to the second computing device (block 516). Transceiver module 134 can also send the composite image to a third computing device located in the environment from which an additional image of the environment is received.

The procedures described herein constitute an improvement over current methods that generate an augmented reality experience and do not accurately and in real time match lighting and shading of the inserted synthetic object with the environment in which the object is inserted. Rather, the procedures described herein insert rendered graphics of synthetic objects in real time in an augmented reality experience such that the lighting and shading of the inserted objects matches the environment in which they are placed. Hence, a photorealistic augmented reality experience is generated in which inserted synthetic objects are indistinguishable from real-world objects in the environment. Accordingly, the procedures described herein are well suited for many applications that require photorealistic augmented reality scenes, such as influencing design and purchasing decisions.

Having considered example procedures in accordance with one or more implementations, consider now example systems and devices that can be utilized to practice the inventive principles described herein.

Example Systems and Devices

FIG. 6 illustrates an example system generally at 600 that includes an example computing device 602 that is representative of one or more computing systems and devices that may implement the various techniques described herein. This is illustrated through inclusion of augmented reality system 114, system 200, augmented reality application 116, and augmented reality support system 112, which operate as described above. Computing device 602 may be, for example, a user computing device (e.g., computing device 104, 106, and 302), or a server device of a service provider, (e.g., server 110). Furthermore, computing device 602 may include an on-chip system, multiple computing devices, combinations thereof, or any other suitable computing device or computing system. Accordingly, FIG. 6 illustrates computing device 602 as one or more of a tablet, a laptop computer, a smart phone, smart eye glasses, and a camera, though these examples are illustrative and in no way are meant to limit the type or number of devices included in computing device 602.

The example computing device 602 includes a processing system 604, one or more computer-readable media 606, and one or more I/O interfaces 608 that are communicatively coupled, one to another. Although not shown, computing device 602 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 120 in FIG. 1 are an example of processing system 604.

Computer-readable storage media 606 is illustrated as including memory/storage 612. Storage 122 in FIG. 1 is an example of memory/storage included in memory/storage 612. Memory/storage component 612 may include volatile media (such as random access memory (RAM)), nonvolatile media (such as read only memory (ROM), Flash memory, optical disks, magnetic disks, and so forth), or combinations thereof. Memory/storage component 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 602 may be configured in a variety of ways as further described below to support user interaction.

Computing device 602 also includes applications 614. Applications 614 are representative of any suitable applications capable of running on computing device 602, and may include a web browser which is operable to access various kinds of web-based resources (e.g., 3D assets, media clips, content, configuration files, services, user profiles, and the like). Applications 614 include augmented reality application 116, as previously described. Furthermore, applications 614 includes any applications supporting augmented reality system 114, system 200, and augmented reality support system 112.

Computing device 602 also includes 3D capture device 616. The 3D capture device 616 can be any suitable device configured to obtain a 3D representation of an environment, such as a 3D scan with depth indicators, point cloud, or mesh of the environment. Hence, 3D capture device 616 may include a 3D scanner, 3D imager, 3D modeler, and the like. The 3D capture device 616 may be included in, or otherwise coupled to 3D data module 138.

Computing device 602 also includes image capture device 618. Image capture device 618 can be any suitable device configured to capture an image of an environment. The image can be one or multiple frames. Hence, image capture device 618 may include a camera, video recorder, scanner, and the like. The image capture device 618 may be included in, or otherwise coupled to image capture module 140.

Computing device 602 also includes augmented reality display 620. Augmented reality display 620 can be any suitable type of display for presenting a photorealistic augmented reality scene. Augmented reality display 620 may be a see-through optic display supporting a direct-view, such as a lens, or an electronic display supporting an indirect view, such as a display screen on a smart phone. Hence, a person may be able to look through augmented reality display 620 presenting a composite image and also may directly view the real-world scene disposed behind augmented reality display 620. Additionally or alternatively, a person can look at augmented reality display 620 to see both an inserted synthetic graphic and the real-world scene as jointly presented on augmented reality display 620 in a composite image. Lenses of computing device 104, display screen of computing device 106, and augmented reality display 312 on computing device 302 are examples of augmented reality display 620.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 602. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 610, or combinations thereof. Computing device 602 may be configured to implement particular instructions and functions corresponding to the software and hardware modules. Accordingly, implementation of a module that is executable by computing device 602 as software may be achieved at least partially in hardware, e.g., through use of computer-readable storage media and hardware elements 610 of processing system 604. The instructions and functions may be executable/operable by one or more articles of manufacture (for example, one or more computing devices 602 or processing systems 604) to implement techniques, modules, and examples described herein.

The techniques described herein may be supported by various configurations of computing device 602 and are not limited to the specific examples of the techniques described herein. This functionality may also be implemented all or in part through use of a distributed system, such as over a "cloud" 622 via a platform 624 as described below.

Cloud 622 includes and is representative of a platform 624 for resources 626. Platform 624 abstracts underlying functionality of hardware (e.g., servers) and software resources of cloud 622. Resources 626 may include applications, data, or applications and data that can be utilized while computer processing is executed on servers that are remote from computing device 602. Resources 626 can also include services provided over the Internet, through a subscriber network, such as a cellular or Wi-Fi network, or combinations thereof. Resources 626 can include 3D asset store 628, which stores 3D assets, such as models and materials assigned to those models, and may be accessed by computing device 602.

Platform 624 may abstract resources and functions to connect computing device 602 with other computing devices. Platform 624 may also serve to abstract scaling of resources to provide a corresponding level of scale to encountered demand for resources 626 that are implemented via platform 624. Accordingly, in an interconnected device embodiment, implementation of functionality described herein may be distributed throughout system 600. For example, the functionality may be implemented in part on computing device 602 as well as via platform 624 that abstracts the functionality of cloud 622.

CONCLUSION

In one or more implementations, a digital medium environment includes at least one computing device (e.g., a user's mobile device) in an environment. Systems and techniques are described herein for presenting a photorealistic augmented reality experience in real time on the computing device. A lighting representation of the environment is obtained from a partial view of the environment, such as from an image of the environment, and used to render a 3D asset (e.g., graphics of a synthetic object). The rendered asset is inserted into the environment by compositing the rendered 3D asset with the image of the environment to form a composite image, accounting for occlusion between the rendered 3D object and the environment, and based on the lighting representation. Photorealistic processing is applied to the composite image by adding lighting for the rendered 3D asset to a portion of the background of the composite image. Consequently, the inserted graphic is indistinguishable from the real-world scene. The image of the environment can include multiple frames, such as in a video sequence, and processing can be done in real time, for each frame of the image of the environment.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to insert rendered assets into an augmented reality experience, a method implemented by a computing device located in an environment, the method comprising:
   obtaining a three-dimensional (3D) representation of the environment;
   obtaining an image of the environment;
   adjusting an adaptive rate based on how quickly lighting in the environment changes;
   determining, at the adaptive rate, a representation of lighting that represents all the lighting in the environment based on the 3D representation and a partial view of the environment from the image of the environment;
   rendering a 3D asset based on the representation of lighting to produce a rendered 3D asset including shading at least some pixels of the rendered 3D asset;
   generating an occlusion mask based on the rendered 3D asset and the image of the environment, the occlusion mask identifying where the rendered 3D asset blocks the environment and where the environment blocks the rendered 3D asset;
   compositing the rendered 3D asset and the image of the environment to form a composite image based on the occlusion mask and the representation of lighting, the compositing including presenting, in the composite image, the rendered 3D asset where the rendered 3D asset blocks the environment, and the image of the environment where the rendered 3D asset does not block the environment; and
   adding lighting for the rendered 3D asset to a portion of a background of the composite image.

2. The method as described in claim 1, wherein the compositing further includes:
   determining a shadow in the environment caused by the rendered 3D asset;
   modifying the image of the environment based on the shadow to produce a modified environment image; and
   presenting the modified environment image in the composite image.

3. The method as described in claim 1, wherein the image of the environment includes multiple frames and the representation of lighting is determined for each frame of the image of the environment that is captured by the computing device.

4. The method as described in claim 1, wherein the image of the environment includes multiple frames and the representation of lighting is determined from the multiple frames of the image of the environment.

5. The method as described in claim 4, wherein at least one of the multiple frames is captured by a different computing device than the computing device and the multiple frames correspond to multiple perspectives of the environment.

6. The method as described in claim 1, wherein the representation of lighting is determined by obtaining a previously-determined representation of lighting of the environment.

7. The method as described in claim 1, wherein the determining the representation of lighting includes:
   receiving an additional representation of lighting from an additional computing device located in the environment; and
   merging the additional representation of lighting with the representation of lighting determined by the computing device.

8. The method as described in claim 1, wherein the compositing is done electronically by presenting on a display pixels of the rendered 3D asset where the rendered 3D asset blocks the environment and pixels of the image of the environment elsewhere including where the environment blocks the rendered 3D asset.

9. The method as described in claim 1, wherein the compositing is done optically with a lens that supports the occlusion mask.

10. The method as described in claim 1, wherein the adding lighting includes masking the portion of the background and compensating for a halo in the image of the environment around the rendered 3D asset.

11. The method as described in claim 1, further comprising updating the adaptive rate at which the representation of lighting is determined based on a change in location of the computing device.

12. The method as described in claim 1, wherein the shading at least some pixels of the rendered 3D asset represents a shadow on the rendered 3D asset cast by the rendered 3D asset.

13. In a digital medium environment, a system comprising:
   a three-dimensional (3D) data module implemented at least partially in hardware of a computing device to obtain a three-dimensional (3D) representation of the environment;
   an image capture module implemented at least partially in hardware of the computing device to capture an image of the environment;
   a lighting representation module implemented at least partially in hardware of the computing device to:

adjust an adaptive rate based on how quickly lighting in the environment changes; and determine, at the adaptive rate, a representation of lighting that represents all the lighting in the environment based on the 3D representation and a partial view of the environment from the image of the environment;

an asset rendering module implemented at least partially in hardware of the computing device to render a 3D asset based on the representation of lighting to produce a rendered 3D asset including shading at least some pixels of the rendered 3D asset;

an occlusion mask generation module implemented at least partially in hardware of the computing device to generate an occlusion mask based on the rendered 3D asset and the image of the environment, the occlusion mask identifying where the rendered 3D asset blocks the environment and where the environment blocks the rendered 3D asset;

a compositing module implemented at least partially in hardware of the computing device to composite the rendered 3D asset and the image of the environment to form a composite image based on the occlusion mask and the representation of lighting, wherein said to composite includes to present, in the composite image, the rendered 3D asset where the rendered 3D asset blocks the environment, and the image of the environment where the rendered 3D asset does not block the environment; and a photorealistic processing module implemented at least partially in hardware of the computing device to add lighting for the rendered 3D to a portion of a background of the composite image.

14. The system as described in claim 13, wherein the representation of lighting is based on a history of images of the environment from the image capture module and 3D representations of the environment from the 3D data module, and indicates where light is coming from in a vicinity of a target insertion point of the rendered 3D asset in the environment.

15. The system as described in claim 13, wherein the representation of lighting includes individual light sources and a panoramic image that encodes light based on direction.

16. The system as described in claim 13, wherein the image capture module captures multiple frames of the image of the environment, the compositing module composites the rendered 3D asset and the image of the environment for each frame of the image of the environment, and the lighting representation module determines a new representation of lighting for some but not all of the multiple frames of the image.

17. The system as described in claim 13, wherein the occlusion mask generation module is configured to generate the occlusion mask by encrypting a sequence of binary indicators that indicate where the rendered 3D asset blocks the environment and where the environment blocks the rendered 3D asset, and the compositing module is configured to decrypt the occlusion mask to form the composite image.

18. In a digital medium environment to insert rendered assets into an augmented reality scene, a method implemented by a first computing device not located in an environment, the method comprising:

a step for obtaining a three-dimensional (3D) representation of the environment;

a step for receiving an image of the environment from a second computing device located in the environment;

a step for adjusting an adaptive rate based on how quickly lighting in the environment changes;

a step for determining, at the adaptive rate, a representation of lighting that represents all the lighting in the environment based on the 3D representation and a partial view of the environment from the image of the environment;

a step for rendering a 3D asset based on the representation of lighting to produce a rendered 3D asset including shading at least some pixels of the rendered 3D asset;

a step for generating an occlusion mask based on the rendered 3D asset and the image of the environment, the occlusion mask identifying where the rendered 3D asset blocks the environment and where the environment blocks the rendered 3D asset;

a step for compositing the rendered 3D asset and the image of the environment to form a composite image based on the occlusion mask and the representation of lighting, the compositing including presenting, in the composite image, pixels of the rendered 3D asset where the rendered 3D asset blocks the environment, and pixels of the image of the environment where the rendered 3D asset does not block the environment;

a step for adding lighting for the rendered 3D asset to a portion of a background of the composite image; and a step for sending the composite image to the second computing device.

19. The method as described in claim 18, further comprising:

a step for receiving an additional image of the environment from a third computing device located in the environment, wherein the representation of lighting is further based on the additional image; and a step for sending the composite image to the third computing device.

20. The method as described in claim 18, wherein the adaptive rate is adjusted further based on a complexity of the environment.

* * * * *